United States Patent
Repperger et al.

(10) Patent No.: US 8,027,537 B1
(45) Date of Patent: Sep. 27, 2011

(54) VISUAL OBJECT IDENTIFICATION BY COMPUTATIONAL MAJORITY VOTING

(75) Inventors: Daniel W. Repperger, Dayton, OH (US); Robert D. Sorkin, Beavercreek, OH (US); Alan R. Pinkus, Bellbrook, OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 1138 days.

(21) Appl. No.: 11/805,262

(22) Filed: May 18, 2007

(51) Int. Cl.
*G06K 9/62* (2006.01)

(52) U.S. Cl. ........................ 382/181; 382/224

(58) Field of Classification Search .................. 382/181, 382/190, 224
See application file for complete search history.

(56) References Cited

U.S. PATENT DOCUMENTS

| | | | |
|---|---|---|---|
| 4,692,943 A * | 9/1987 | Pietzsch et al. | ............... 382/148 |
| 5,046,027 A | 9/1991 | Taaffe et al. | |
| 5,179,651 A | 1/1993 | Taaffe et al. | |
| 5,191,525 A | 3/1993 | LeBrun et al. | |
| 5,432,864 A | 7/1995 | Lu et al. | |
| 5,528,698 A | 6/1996 | Kamei et al. | |
| 5,550,928 A | 8/1996 | Lu et al. | |
| 5,774,357 A | 6/1998 | Hoffberg et al. | |
| 6,024,287 A | 2/2000 | Takai et al. | |
| 6,526,158 B1 | 2/2003 | Goldberg | |
| 6,599,130 B2 | 7/2003 | Moehrle | |
| 6,775,033 B1 | 8/2004 | Nobuta et al. | |
| 6,819,783 B2 | 11/2004 | Goldberg et al. | |
| 6,904,168 B1 | 6/2005 | Steinberg et al. | |
| 2005/0025357 A1 * | 2/2005 | Landwehr et al. | ............. 382/170 |
| 2008/0025591 A1 * | 1/2008 | Bhanot et al. | ................. 382/132 |
| 2008/0069437 A1 * | 3/2008 | Baker | ........................... 382/159 |

OTHER PUBLICATIONS

Qin et al. "Personal Identification System Based on Multiple Palmprint Features." 9th International Conference on Control, Automation, Robotics and Vision, Dec. 5, 2006, pp. 1-6.*
Lam et al. "Application of Majority Voting to Pattern Recognition: an Analysis of its Behavior and Performance." IEEE Transactions on Systems, Man and Cybernetics, Part A: Systems and Humans, vol. 27, No. 5, Sep. 1997, pp. 553-568.*
Wang et al. "GA-Based Feature Subset Clustering for Combination of Multiple Nearest Neighbors Classifiers." Proceedings of 2005 International Conference on Machine Learning and Cybernetics, vol. 5, Aug. 18, 2005, pp. 2982-2987.*
Repperger et al. "Object Recognition via Information-Theoretic Measures/Metrics." Proceedings of SPIE-IS&T Electronic Imaging, SPIE vol. 6498, Feb. 28, 2007, 12 pages.*

* cited by examiner

*Primary Examiner* — Jon Chang
(74) *Attorney, Agent, or Firm* — AFMCLO/JAZ; Fredric Sinder

(57) ABSTRACT

A method of distinguishing an object in an image. The method including the steps of detecting an image with an optical device where the image includes at least one object. Identifying at least one object using a central processing unit (CPU) that includes a central processing algorithm (CPA) and uses a majority voting analysis of multiple inputs to analyze at lest one object with the CPA. The image selected by the CPU is then displayed on the optical device.

13 Claims, 5 Drawing Sheets

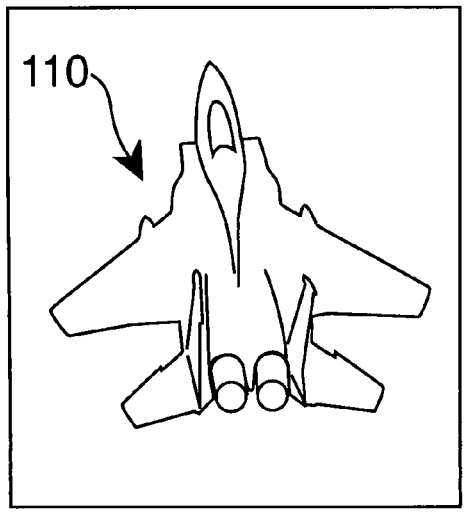
Fig. 1A
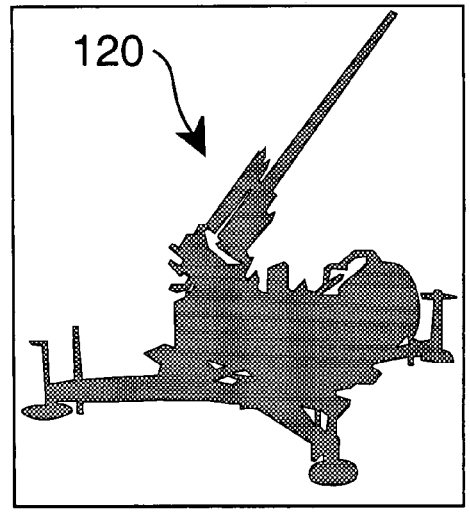
Fig. 1B
Fig. 1
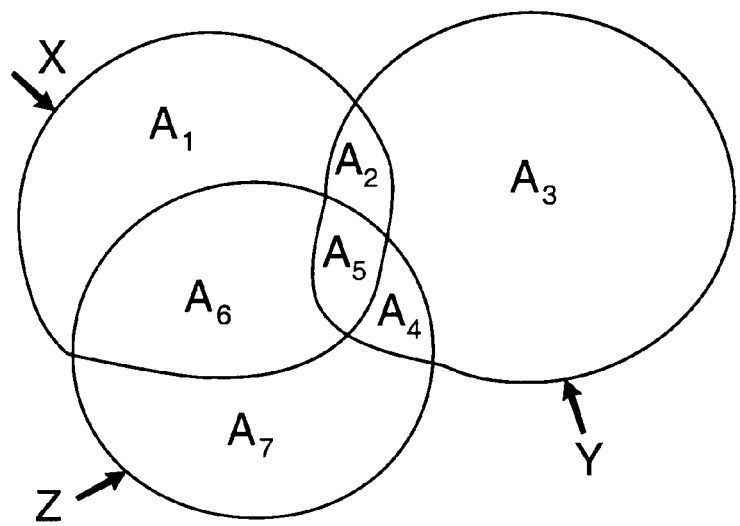
Fig. 5

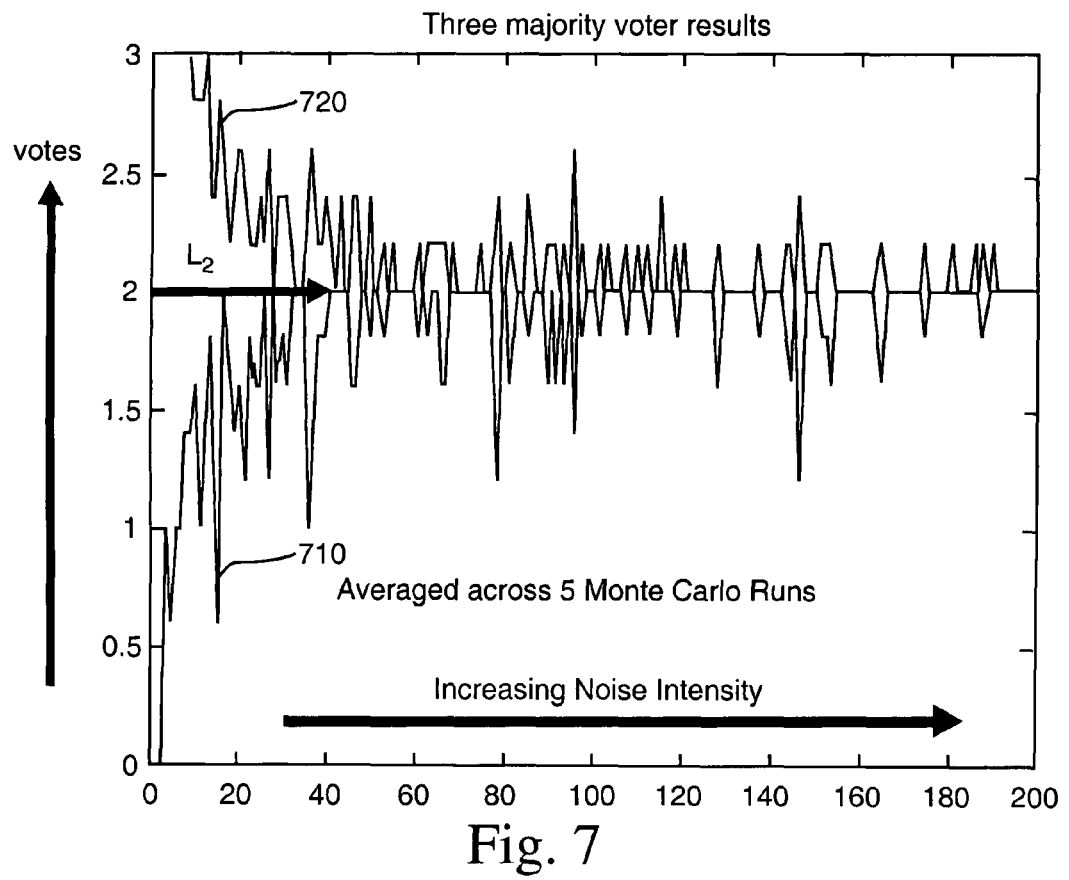
Fig. 7
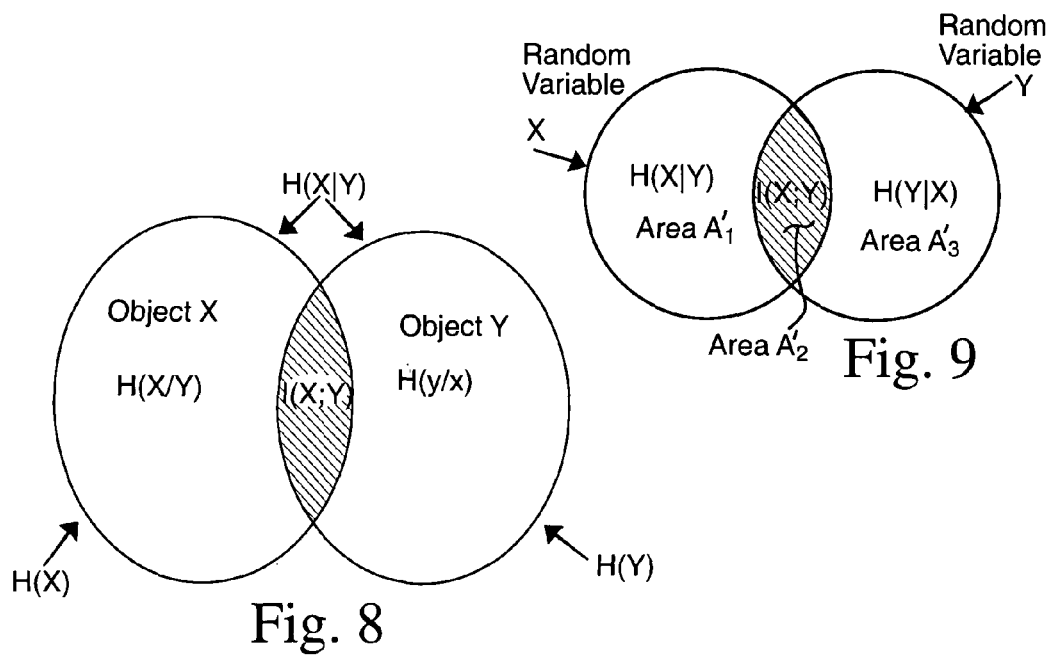
Fig. 8
Fig. 9

VISUAL OBJECT IDENTIFICATION BY COMPUTATIONAL MAJORITY VOTING

RIGHTS OF THE GOVERNMENT

The invention described herein may be manufactured and used by or for the Government of the United States for all governmental purposes without the payment of any royalty.

BACKGROUND OF THE INVENTION

The invention relates to identifying and distinguishing observed objects by analyzing the image with a plurality of independent data inputs.

In E. Steinberg, P. Bigioli, and I. Raducan, U.S. Pat. No. 6,904,168, Oct. 22, 2001, "Workflow system for detection and classification of images suspected as pornographic," the application involved detection and classification of images being suspected as being pornographic. This method employed shape, texture, curvature and pose characteristics of the images to rank certain pictures as high probability of being pornographic.

In D. A. Goldberg, U.S. Pat. No. 6,526,158, Feb. 25, 2003, "Method and system for obtaining person-specific images in a public venue," facial recognition systems were used to find a specific person in an audience. A face recognition system was employed as well as other meta-information about that person.

In H. Nobuta, Y. Ueno, S. Matsuzaki, T. Toyama, M. Nakao, and N. Sugawara, U.S. Pat. No. 6,775,033, Aug. 10, 2004, "Image communication apparatus and communication control method thereof," an image communication apparatus and control method of sending and receiving pictures was discussed.

In D. Lu, C. T. Shagrin, W. L. Thomas, M. Lee, B. Bernard, and J. Zhang, U.S. Pat. No. 5,550,928, Aug. 27, 1996, "Audience measurement system and method," the goal was to find a particular member in the audience. A template matching scheme was presented, but it differs from the methodology presented in this patent application.

In S. M. Hoffberg, and L. I. Hoffberg-Borghesani, U.S. Pat. No. 5,774,357, Jun. 6, 1998, "Human-factored interface incorporating adaptive pattern recognition based controller apparatus," an adaptive pattern recognition scheme was presented which used both temporal and spatial user characteristics, but differs from the material presented in the sequel in this patent application.

In D. A. Goldberg, M. B. Goldberg, M. D. Goldberg and B. M. Goldberg, U.S. Pat. No. 6,819,783, Nov. 14, 2003, "Obtaining person-specific images in a public venue," disclosed a method and system for identifying images of people in a public venue by electronically merging identification information into the image information. This procedure provides a "tag" to identify the image with a marker to keep track of the person of interest.

In R. D. Sorkin and H. Dai, "Signal Detection Analysis of the Ideal Group," *Organizational Behavior and Human Decision Processes*, 60, 1994, pp. 1-13 signal detection theory was used with analysis of the ideal group. It showed that the signal to noise ratio of certain key variables increased with the square root of the number of the constituent voters provided they were independent. An efficiency measure of performance of the observed group to decision making was identified.

In R. D. Sorkin, R. West, and D. E. Robinson, "Group Performance Depends on the Majority Rule," *Psychological Science*, Vol. 9, No. 6, November, 1998, pp. 456-463, the majority rule was investigated when it may not be a simple majority in the decision process (for example two-thirds or three-fourths of the majority).

In R. D. Sorkin, C. J. Hays, and R. West, "Signal-Detection Analysis of Group Decision Making," *Psychological Review*, Vol. 108, No. 1, 2001, pp. 183-203, signal detection theory was employed for groups of decision makers to examine their efficacy. As the group size changed, how this modified decision-making ability was studied.

Performance is examined in R. D. Sorkin, S. Luan, and J. Itzkowitz, "Group Decision and Deliberation: A Distributed Detection Process," Book Chapter, Chapter 23, pp. 464-484, for a distributed framework for group decision where deliberation was performed. Investigation of the bias (used in the individual decision rules of each voter) was determined and its relationship to the likelihood ratios of the binary choices.

All references made in the present specification are herein incorporated by reference.

BRIEF DESCRIPTION OF THE DRAWINGS

FIG. 1A is a representation of a good (friend) object image 110.

FIG. 1B is a representation of a bad (foe) object image 120.

FIG. 5 shows a constructed visualization of a violation of equation (B.20).

FIG. 7 is a visual representation of Monte Carlo simulation results with 3 votes.

FIG. 8 is a VENN diagram of the information variables.

FIG. 9 is a geometric argument that the described parsimonious information-theoretic variable $D_R$ is a measure and not a metric.

DETAILED DESCRIPTION

Friend or Foe (FOF) identification is an important aspect of combat operations for the military. FIG. 1A shows a good (friend) object image 110. FIG. 1B shows a bad (foe) object image 120. An object, when first observed by an operator, may be very small in size, have poor contrast, and the brightness level of the object may be too bright or too dark to make an immediate and accurate identification. The operator can make one of two responses: (1) Fire a weapon at the object feeling that it is hostile, or (2) Passively wait with the presumption that the object may be friendly.

Either error, friendly fire (shooting the object when it is a friendly object) or not shooting the hostile object both has significant consequences to the operator. Further, waiting may give the hostile object time to shoot the operator if he waits too long. Thus, both speed and accuracy are important performance attributes in this task.

Figure 2:
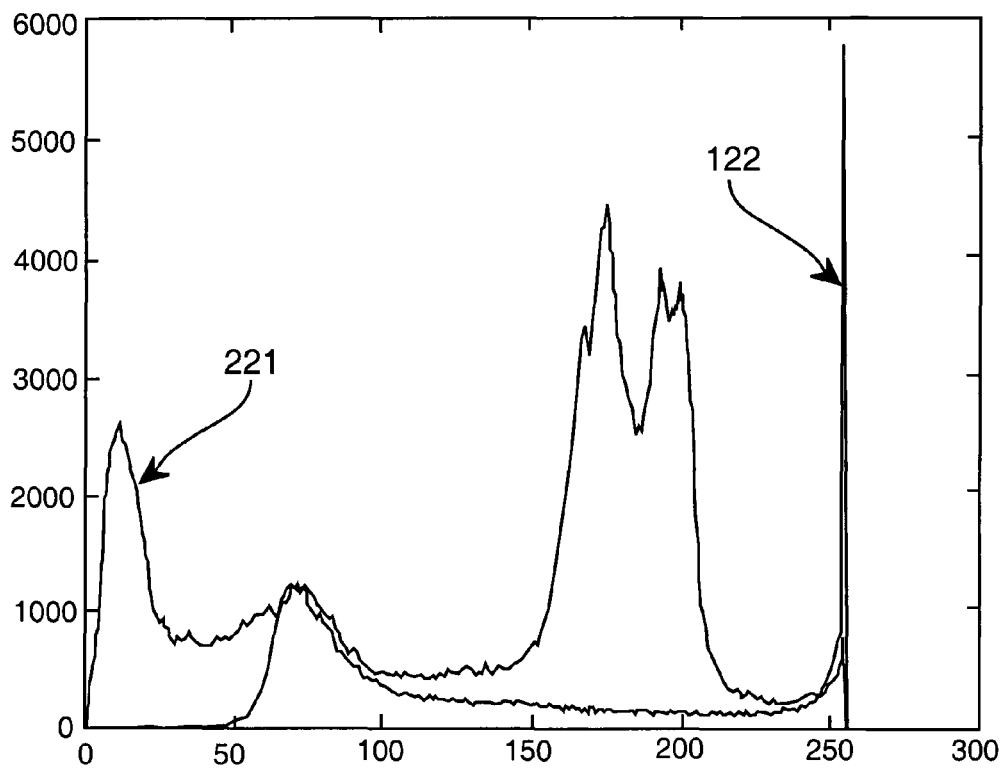
FIG. 2 is a representative of the histograms of the intensity of the objects in FIG. 1.

FIG. 2 displays a plot of the histograms of the intensity of the black and white (uncolored) objects in FIG. 1. Histogram 221 is a histogram of the good object 110 and a second histogram 122 is of the bad object 120. The histogram diagram of FIG. 2 is a plot with the y-axis being the frequency (number of pixels in the image of the object) versus brightness level on the x-axis. There are 256 levels on the x-axis. This implies that the brightness levels were characterized in terms of $2^8$ levels of intensity from pure black (to the left, at zero) to pure white (to the right, at 255) which defines the granularity of the levels of brightness. The histograms represent the "signatures" of each object. Histogram signatures are reasonably invariant to rotation of the object (for images taken from the air) and they may scale down proportionally for size change of the image object.

Figure 3:
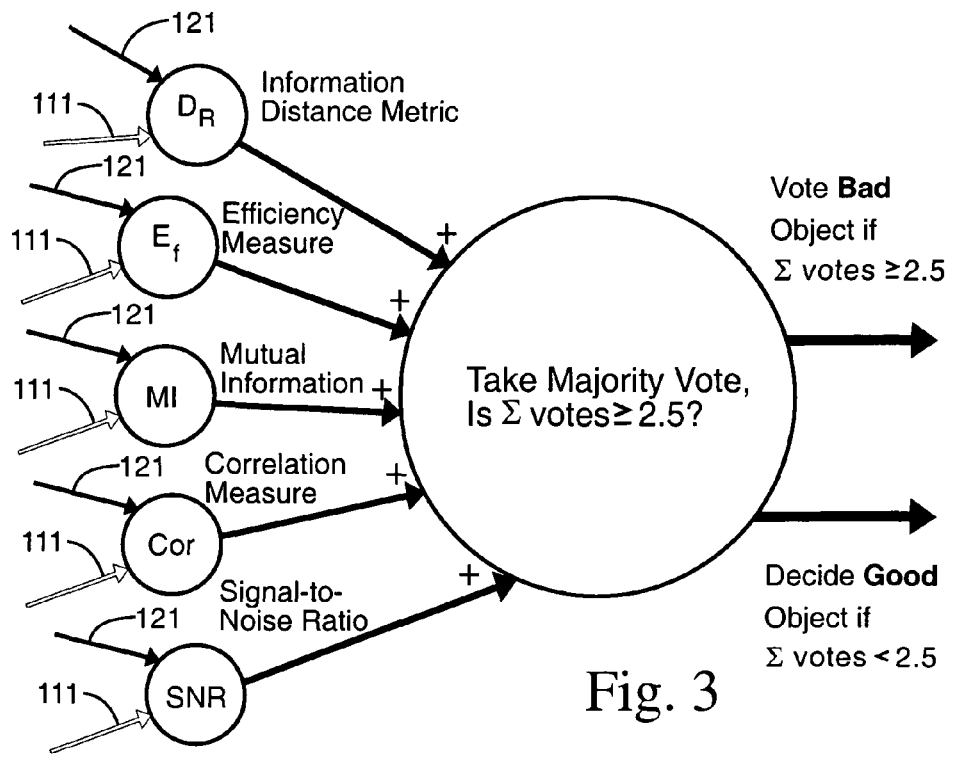
FIG. 3 is a box diagram representation of a majority voting scheme embodiment.

FIG. 3 is a box diagram of a majority voting scheme. The good object image 110 and the bad object image 120 provide inputs of various specific independent parameters. Majority voting schemes provide many advantages for certain classes of voters. For example, it was shown in L. Lam and C. Y. Suen, "Application of Majority Voting to Pattern Recognition: An Analysis of its Behavior and Performance," *IEEE Transactions on Systems, Man, and Cybernetics-Part A: Systems and Humans*, Vol. 27, No. 5, September, 1997, pp. 553-568 that a majority voting scheme is as effective as any neural network, genetic algorithm, Bayesian net, or other decision making process, if it can be shown that the independent voters are adequately orthogonal (independent) in their decision making and they reasonably span the parameter space in terms of how the decisions are being rendered.

The present invention uses an independent set of selected constitute voters. The least parsimonious number of such voters (smallest number to completely describe the information channel) was selected such that computational advantages of simplicity and shorter calculation time may be obtained. The present invention demonstrates the smallest number of independent set of voters that can render a decision using information-theoretic means.

The utility that majority voting adds to the decision-making process can be derived from the Condorcet's theorem (see P. J. Boland, "Majority Systems and the Condorcet Jury Theorem," *Statistician*, Vol. 38, 1989, pp. 181-189). If the voters that identify the object as friend or foe each have a classification error less than 0.5 and all classifiers have the same error rate (an assumption), for an odd number of voters (classifiers), N, the correct decision rate increases with increasing N. Thus the error in a decision process can be made arbitrarily small if a large number of voters (classifiers) N can be used who operate on small error rates.

Lam and Suen showed that if all voters (classifiers) were independent, then the majority-voting scheme out performs any other decision-making scheme including neural networks, Bayesian nets, genetic algorithms, etc. The key question is: do the voters constitute an independent set? To fairly test the independence and utility of the unique parameters of the present invention two cases were herein tested.

Figure 4:
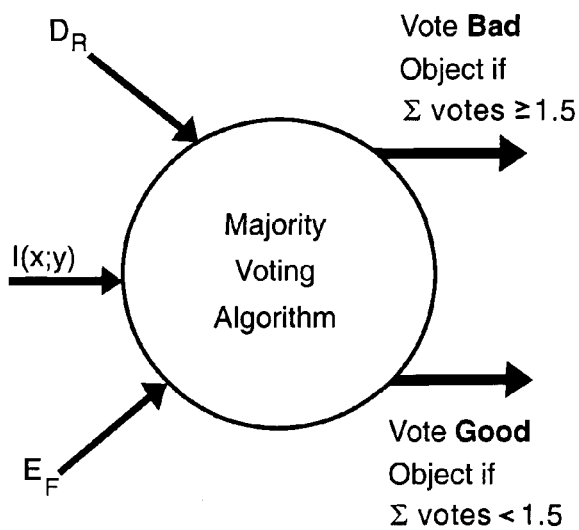
FIG. 4 is shows a box diagram representation of one embodiment of the present invention.

FIG. 4 shows one embodiment of the present invention wherein there are three variables including $D_R$, I(x; y), and $E_F$. $D_R$, is an information distance metric. I(x; y) is a mutual information measure, and $E_F$ is an efficiency normalization measure. These three variables result in three votes (0 or 1) as to the friend or foe status of an object. A summation of votes of more than 1.5 results in a decision as to the identity of the object as a foe.

These three variables are derived from the Shannon information variables disclosed in C. E. Shannon, "Communications in the Presence of Noise," Proceedings of the IRE, 37, pp. 10-22, 1949 which is herein incorporated by reference. The Shannon information Variables include:

$H(x)$=The input uncertainty in the input symbol set to the channel. (A.1)

$H(y)$=The final output uncertainty of the output set to the channel. (A.2)

$H(x/y)$=The equivocation lost to the environment. (A.3)

$H(y/x)$=The spurious uncertainty provided by the environment on the channel (A.4)

$I(x;y)$=The mutual information transmitted through the information channel. (A.5)

The four H(.) quantities in equations (A.1-A.4) are considered only as uncertainty variables. Information (I(x; y)) has only the role as a measure of the reduction of uncertainty.

A Venn diagram of these five variables is shown in FIG. 8.

For an information channel with input symbol set x∈X, of size n, and received symbols y∈Y at the output set of size q (q may not equal n), the following relationships can be stated:

$$H(x) = \sum_{i=1}^{n} p(x_i)\log_2(1/p(x_i)) \quad (A.6)$$

$$H(y) = \sum_{j=1}^{n} p(y_j)\log_2(1/p(y_j)) \quad (A.7)$$

$$H(x, y) = \sum_{i,j}^{n,q} p(x_i, y_j)\log_2(1/p(x_i, y_j)) \quad (A.8)$$

$$H(x/y) = \sum_{i,j}^{n,q} p(x_i, y_j)\log_2(1/p(x_i \mid y_j)) \quad (A.9)$$

$$H(x/y) = \sum_{i,j}^{n,q} p(x_i, y_j)\log_2(1/p(y_j \mid x_i)) \quad (A.10)$$

In calculating all the uncertainty terms H(.), if p(.)=0, the contribution to the H(.) variable is set to zero. Actually it can be shown, in a more detailed analysis that the contribution of a zero probability term to the H(.) variable is, without question, zero.

A summary compendium is now listed of a number of important properties of the key variables (A.1-A.5). From FIGS. 5, 8 and 9; and the basic definitions A.6-A.10, the following relationships can be shown to be true:

$I(x;y)=H(x)+H(y)-H(x,y)$ (A.11)

$H(x/y)=H(x)-I(x;y)$ (A.12)

$H(y/x)=H(y)-I(x;y)$ (A.13)

Since H(x)>0, H(y)≧0, H(x,y)≧0, H(x/y)≧0, and H(y/x)≧0, it also follows that:

$I(x;y) \geq 0$ (A.14)

$I(x;y)=I(y; x)$ (A.15)

$I(x; x)=H(x)$ (A.16)

$I(x;y) \leq \min(H(x), H(y)) \leq H(x,y) \leq H(x)+H(y)$ (A.17)

$$I(x;y)=H(x)-H(x/y)=H(y)-H(y/x)=H(x,y)-H(y)=H(x,y)-H(x) \quad (A.18)$$

$$H(x/y)=H(x)-I(x;y) \quad (A.19)$$

$$H(y/x)=H(y)-I(x;y) \quad (A.20)$$

A relative information distance metric $D_R$ may be defined as:

$$D_R=H(x/y)+H(y/x)=H(x)+H(y)-2I(x;y)=2H(x,y)-H(x)-H(y) \quad (A.21)$$

Efficiency measure $E_f$ follows:

$$E_f=(I(x;y)/H(x)) \text{ for } H(x)>0. \quad (A.22)$$

Therefore, all the five Shannon variables may be written in terms of the three key constituent information quantities (I, $E_f$ and $D_R$). For completeness, all eight relationships follow to show the unique, bijective, mapping that exists between the five uncertainty variables derived by Shannon and the three information quantities introduced here. In one practical case H(x)>0, I>0 which implies $E_f$>0. The five Shannon variables satisfy:

$$H(x)=[I(x;y)]/E_f \quad (A.23)$$

$$H(x/y)=[I(x;y)(1-E_f)]/E_f \quad (A.24)$$

$$H(y/x)=D_R-I(x;y)(1-E_f)/E_f \quad (A.25)$$

$$H(y)=I+D_R-I(x;y)(1-E_f)/E_f \quad (A.26)$$

$$I(x;y)=I(x;y) \text{ (this variable was and remains information variable)} \quad (A.27)$$

With further derivation:

$$D_R=H(x/y)+H(y/x) \quad (A.28)$$

$$E_f=[I(x;y)]/H(x) \quad (A.29)$$

$$I(x;y)=I(x;y) \quad (A.30)$$

Thus, there exists a unique, bijective, one-to-one mapping between the Shannon variables and the three parsimonious variables selected herein ($D_R$, $E_f$, and I). Hence, the variables $D_R$, $E_F$ and I(x; y) may be used for the present object identification problem involving two objects.

When input X and output Y are independent (far apart from each other) $D_R$ is at a maximum. When X and Y are 100% correlated, then $D_R$ is zero. When X and Y fall between the extremes of being independent or totally correlated, then $D_R$ is a positive number indicating a relative information distance between the random variables X and Y. For the efficiency measure $E_F$, when the random variables X and Y are independent, then I=0 and $E_F$=0 indicating that the information channel is not efficient in producing information or reduction of uncertainty at the output. When X and Y are completely dependent, then $E_F$=1, its largest value, so the information channel is maximally efficient in producing an information flow. For the intermediate case where X and Y have some correlation, then $E_F$ falls between 0 and 1 and reflects the percent of information flowing in relation to its original input H(x) and it is normalized, accordingly. Note that both I(x; y) and $E_f$ are measures, and not metrics. $D_R$ is a relative distance information metric.

A measure is an objective means of evaluating differences between quantities such as random variables. A metric is a true distance measure between two objects which also satisfies the triangular inequality which we shown later.

To show a one-to-one bijective mapping between the five Shannon uncertainty variables in equations (A.1-A.5) and the three information variables described in equations (A.18, A.21 and A.22), the five Shannon variables may be expressed in terms of the three parsimonious quantities ($D_R$, $E_F$ and I(x; y)).

The mutual information term I(x; y) appears both as a Shannon variable and as an information measure in the new formulation and requires no transformation. Therefore it is only necessary to show the bijective mappings between $D_R$, $E_F$ and the five Shannon variables: I(x; y), H(x), H(y), H(x/y), and H(y/x). Variables x1, x2 and x3 are introduced to help simplify the notation in the subsequent equations. For notational simplicity, let $D_R=x_1=H(x/y)+H(y/x)$, $x_3=I(x; y)=H(x)-H(x/y)=H(y)-H(y/x)$, and let $E_f=x_2=I(x; y)/H(x)=x_3/H(x)$, (since x3=I(x; y)).

It can immediately be shown that $H(x)=x_3/x_2$, so the first Shannon relationship is demonstrated. Substitute this relationship for H(x) into the expression: $x_3=H(x)-H(x/y)$ to get the relationship $x_3=(x_3)/(x_2)-H(x/y)$. Solving for H(x/y) yields: $H(x/y)=(x_3)*(1-x_2)/(x_2)$. To get a similar relationship for H(y/x) use the symmetric property of the mutual information, i.e. $I(x; y)=H(x)-H(x/y)=H(y)-H(y/x)=x_3$. This shows that $H(y/x)=x_1-H(x/y)=(x_3)(1-x_2)/(x_2)$. Finally knowing H(y/x) it is possible to reuse the mutual information relationship to recover H(y), via $H(y)=x_3+H(y/x)$ or $H(y)=x_3+x_2-x_3(1-x_2)/(x_2)$. Thus, all five Shannon quantities are now uniquely expressed in terms of the $x_1$, $x_2$, and $x_3$ variables which provide a parsimonious representation of the information channel with the presumptions that H(x)>0 and I>0, and $E_f$>0.

The three information variables ($D_R$, $E_F$ and I(x; y)) may be represented in terms of the five Shannon variables (H(x), H(y), H(x/y), H(y/x) and I(x; y)), it follows that $D_R=x_1=H(x/y)+H(y/x)$ and $E_f=x_2=x_3/H(x)=I(x; y)/H(x)$ and finally I(x; y)=I(x; y).

To convert the image identification problem into an information-theoretic paradigm the key quantities H(x), H(y), I(x; y), H(x/y) and H(y/x) may be calculated from the image identification problem. The calculation of H(x), H(y), I(x; y), H(x/y) and H(y/x) may be achieved by:

Step 1: Find the information quantities. The original image A has m rows and n columns. A joint histogram matrix Joint$_{histogram}$ is constructed. The matrix may be any size but is preferably a size of about 256×256 if the brightness levels go from about 0 to about 255. These are typically called 8 bit intensity levels.

Step 2; Each cell of the 256×256 Joint$_{histogram}$ is initially set to zero. Two matrices C and D are used where is the input image into the channel and D is the received image at the output. C and D must be the same size matrices (contain the same number of rows and columns).

Step 3: At each corresponding pixel of the C and D matrices, determine what two intensity (brightness level) values are at each common pixel (Int$_1$ for C and Int$_2$ for D). Then increase by 1 unit (in Joint$_{histogram}$) in the cell which has brightness levels Int$_1$ in the row and Int$_2$ in that column of the matrix Joint$_{histogram}$. As a result, counts or hits are accumulating or cells have a common histogram intensity level this is a definition of frequency as used in information theory.

Step 4: The Joint$_{histogram}$ is filled with a total of m×n 1's. This matrix is normalized to a contingency table matrix which occurs in communications theory by dividing every element of Joint$_{histogram}$ by the sum of all 1's in the matrix (the total sum=m*n). This normalized matrix is now similar to a contingency table, for example, that occurs in communications theory. All five of the Shannon information quantities can now be calculated. H(x) is calculated across the rows, H(y) is calculated at the bottom of the columns, and H(x,y) is calculated within each cell for a cell element non zero. Equations (A.18-20) are then used for the remaining variables.

The techniques are well known in the literature for calculating the key information variables H(x), H(y), I(x; y), H(x/y) and H(y/x) in images.

The metric and measure properties of the information-theoretic variables $D_R$ and I(x; y). I(x; y) is a measure and not a metric. A true metric ρ(x,y) must satisfy the following four relationships as identified in T. M. Cover and J. A. Thomas, "Elements of Information Theory," John Wiley & Sons, Inc, 1991, and incorporated herein by reference:

$$\rho(x,y) \geq 0 \text{ for all x and y. (positivity)} \quad (B.1)$$

$$\rho(x,y) = \rho(y,x) \text{ (similarity)} \quad (B.2)$$

$$\rho(x,z) \leq \rho(x,y) + \rho(y,z) \text{ (triangular inequality)} \quad (B.3)$$

$$\rho(x,x) = 0 \quad (B.4)$$

The I(x; y) does not satisfy the triangular inequality, $$I(x;y) \leq I(x;y) + I(y; z) \quad (B.5)$$

Therefore, I(x; y) is classified as a measure and not a metric. However, $D_R$ is a metric since it also satisfies the triangular inequality. To show the $D_R$ is a metric, FIG. 9 is instructive using geometric arguments for two random variables X and Y with some overlapping influence. FIG. 9 shows the quantities H(x/y), H(y/x) and I(x; y) specified in terms of the area $A_1$, area $A_2$, and area $A_3$ as follows:

$$H(x/y) = A_1' \quad (B.6)$$

$$H(y/x) = A_3' \quad (B.7)$$

$$I(x;y) = A_2' \quad (B.8)$$

FIG. 5 generalizes this concept to three random variables X, Y, Z. In terms of the seven areas ($A_1$-$A_7$) displayed in FIG. 5, the following relationships become generalizations of FIG. 9 into FIG. 5:

$$H(x/y) = A_1 + A_6, I(x;y) = A_2 + A_5 \quad (B.9)$$

$$H(y/x) = A_3 + A_4, I(y; x) = A_5 + A_2 \quad (B.10)$$

$$H(z/x) = A_4 + A_7, I(z; x) = A_5 + A_6 \quad (B.11)$$

$$H(x/z) = A_1 + A_2, I(x; z) = A_6 + A_5 \quad (B.12)$$

$$H(z/y) = A_2 + A_3, I(y; z) = A_5 + A_4 \quad (B.13)$$

$$H(z/y) = A_6 + A_7, I(z; y) = A_4 + A_5 \quad (B.14)$$

Note that the $A_1$, $A_2$ and $A_3$ in FIG. 5 are not the same as the $A_1'$, $A_2'$ and $A_3'$ in FIG. 9. Rather they represent similarities in the simplification of the variables.

To show that equation (B.1) is true, ($D_R(x,y) \geq 0$) is obvious from the definition:

$$D_R(x,y) = H(x/y) + H(y/x) \quad (B.15)$$

This is true where all terms H(x/y) and H(y/x) are positive or zero. The relationship, equation (B.2) ($D_R(x,y) = D_R(y,x)$) follows from the definition of $D_R(x,y)$ given in (B.15). The condition in equation (B.3) ($D_R(x,x) = 0$) may be true if there is a one-to-one mapping X to Y such that X≈Y. This is consistent with what occurs when the random variables X and Y are highly correlated ($D_R = 0$).

For the equation B.3 relationship, the triangular inequality may be difficult to show but geometric arguments in terms of the areas are used herein as follows:

$$\Rightarrow D_R(x,y) + D_R(y,z) \geq D_R(x,z) \quad (B.16)$$

$$\Rightarrow H(x/y) + H(y/x) + H(y/z) + H(z/y) \geq H(x/z) + H(z/x) \quad (B.17)+$$

$$\Rightarrow A_1 + A_6 + A_3 + A_4 + A_2 + A_3 + A_6 + A_7 \geq A_1 + A_2 + A_4 + A_7 \quad (B.18)$$

$$\Rightarrow 2A_6 + 2A_3 \geq 0 \quad (B.19)$$

Equation B.17 follows from the definitions of D(.,.). Equation B.18 substitutes in the area relationships using equations B.9-B.14. Equation B.19 follows by subtracting from B.18 on both the right and left hand side of the equation a common term $A_1 + A_2 + A_4 + A_7$.

Equation B.19 is always true. It is only necessary to show that I(x; y) does not satisfy the triangular inequality which disqualifies it as a metric. Again, geometric arguments in terms of the areas are used here as follows:

$$\Rightarrow I(x;y) + I(y; z) \geq I(x; z) \quad (B.20)$$

$$\Rightarrow A_2 + A_6 + A_6 + A_4 \geq A_6 + A_6 \quad (B.21)$$

$$\Rightarrow A_2 + A_5 + A_4 \geq A_6 \quad (B.22)$$

Equation B.22 may not be true. FIG. 5 shows a constructed counter example where equation (B.20) is violated with I(x; z)>I(x; y)+I(y; z) due to the fact that the areas satisfy $A_6 > A_2 + A_5 + A_4$. Variables $D_R$, I(x; y), and $E_F$ constitute an independent basis in an information sense and are all that is necessary to describe the pertinent features of the object of interest.

In a majority sense for Case 2, if $D_R$, I(x; y) and $E_F$ vote on the object either being Bad (vote=1) or Good (vote=0), then the majority vote would be if at least 1.5 of the 3 votes are cast. FIG. 3 presents more details on how each vote may be cast. For example, $D_R$ may be calculated for the good object and $D_R$ for the Bad object from the sample image $A_m$. If $D_{R\text{-}good\ object} > D_{R\text{-}bad\ object}$, then the vote is set to 1, which selects the bad object. This is because the information distance metric $D_R$ has calculated that the distance (in the sample image $A_m$) from the good library object is larger that the distance from the bad library object. $D_R$ is an information distance metric since it measures differences and distances between two objects (random variables X and Y). Thus in FIG. 3, a good object arrow 111 and a bad object arrow 121 may be used to compare each sample with each possible library object. Similar logic is applied to the votes for I and $E_F$ in FIG. 3.

For the Case 1 test in FIG. 3, five voters are used. The two additional voters are standard image algorithms of correlation (Cor) and a signal to noise ratio that occurs in image processing algorithms as described in equation (1) below. These are not information measures, but may add some value to the improvement of the decision making. The function "Cor" takes a correlation matrix between a plot of the sample image $A_m$ with each of the library histograms of the good object 110 and the bad object 120. The SNR is a measure used in image processing in which the following ratio is determined:

$$SNR = (\Sigma \text{Histograms of } A_m)/(\Sigma \text{Histograms of } A_m - \text{Histograms of } A_L) \quad (1)$$

Where $A_L$ is either a library image of the good or bad object. If the Cor function or the SNR function is larger for either the good or bad library object, the vote is taken in that direction. The two measures (Cor and SNR) are used in the image processing community, so this test may evaluate the three parsimonious information-theoretic measures/metric developed herein as a basis to more traditional methods such as the five variable case.

Figure 6:
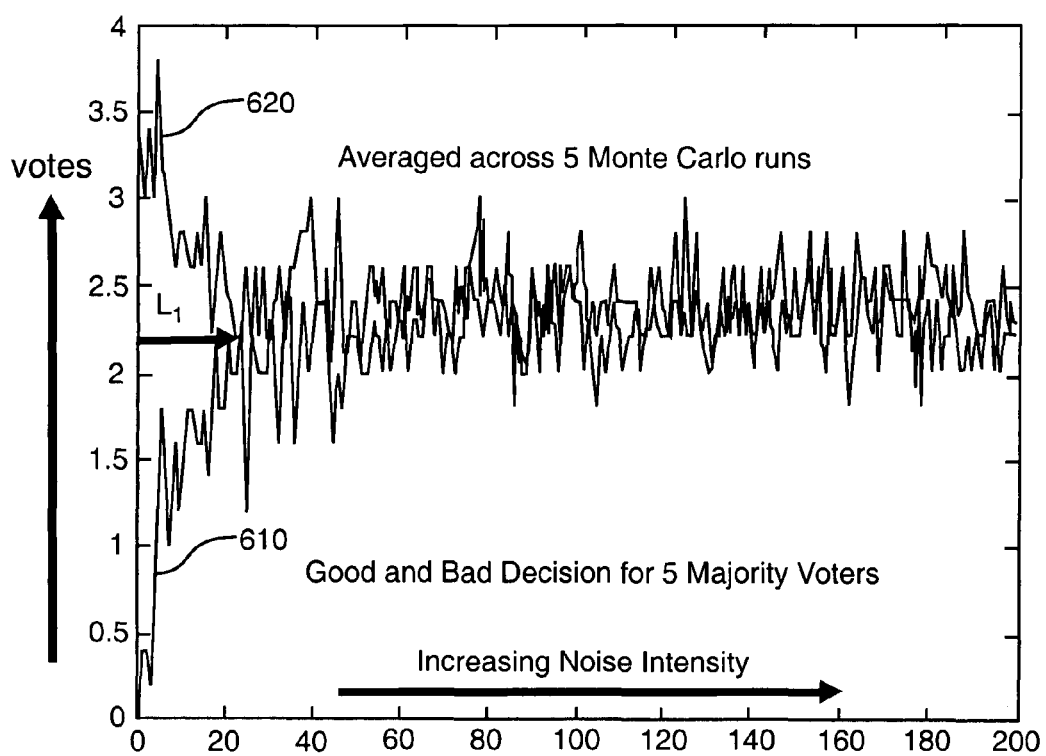
FIG. 6 is a visual representation of Monte Carlo simulation results with 5 votes.

The testing of the disclosed variables may be conducted using a Monte Carlo simulation with white Gaussian noise of different power being added to the test image. One thousand Monte Carlo runs were simulated with the ground truth being either the image of the good object 110 or the bad object 120 of FIG. 1. The ground of truth means the real or true identity of the objects of interest. The average of 5 runs is displayed in FIG. 6 and FIG. 7 with the ground truth objects. FIG. 6 shows case 1, the situation where the five voters make a decision. White Gaussian noise increases on the x axis. In FIG. 6 line 620 represents the culmination of bad object votes. Line 610 is the Monte Carlo culmination of good object votes. FIG. 7 shows case 2, the situation where only the three votes from the three parsimonious information-theoretic variables are cast under similar noise values. Again, while different data, line 720 represents the culmination of bad object votes. Line 710 is the Monte Carlo culmination of good object votes. These graphs indicate an average of five Monte Carlo runs such as those shown in FIG. 4 and in FIG. 3. As shown in FIG. 3 the object is considered a foe if the summation of votes is greater than or equal to 2.5 of the five inputs. As shown in FIG. 4 the object is considered a foe if the summation of votes is greater than or equal to 1.5 of the three inputs. Other vote summation totals may be used depending upon the number of Monte Carlo simulations run and the degree of precision available for analysis or needed for a given situation. The analysis may also include a range of uncertainty around 1.5 where no determination is made. For example, in FIG. 4 may conclude that if the summation of votes is greater than 1.75 is a hostile object while if the total is less than 1.1 the object is a friendly object. If the summation of votes occurs between those two values, no determination about the object is made. This can be used to increase the certainty of the conclusion being correct, which also sacrifices the availability of a probably correct determination. The summation of votes may be converted to a identification certainty percentage which communicates the degree of certainty of the object image identification, based upon the voting results. The more divergent the votes between friend or foe; or between a choice of objects, the greater the certainty that the identification selected for an object is the correct identification.

FIG. 6 portrays the failure of the algorithm for a noise intensity parameter of $L_1$ units, as indicated. Failure means the ground truth objects cannot be distinguished. A signal detection theory approach is taken to define this end point of confusion. A miss occurs when the object is a bad object, but the decision rule selects the good object. A false positive occurs for the case that the object selected is the bad object, when the ground truth is that the object is really the good object. Using this signal detection theory framework, the area under a ROC (receiver operator characteristic) curve is one method to evaluate performance. However, the efficacy may also be demonstrated by the level of noise intensity before the ground truth objects are confused. For example, FIG. 6 (Case 1) shows votes obtained from the case of 5 majority voters for both objects fail at $L_1$ units of noise intensity.

FIG. 7 (Case 2) portrays the results for only using the parsimonious representation of the three information-theoretic variables I, $D_R$ and E, in equations (A.28-A.30) with $L_2$ units of noise power occurring before the algorithm fails (the objects cannot be distinguished).

Comparing FIG. 6 to FIG. 7, ($L_2 > L_1$) the intensity of the noise before confusion sets in between the ground truth objects provides a relative comparison of the decision rules. The length of L1 versus the length of L2 may be used as a measure of efficacy where the longer length is the more effective. In Case 2, three information-theoretic variables $D_R$ and $E_f$ performed better identification results than the five variable model. One reason for the better performance by just three variables may be that the votes are truly independent and with fewer votes, the bias introduced by non independent voters is mitigated. In other words, little performance gain was achieved by adding two additional data streams of variables, if the new data parameters were not independent from the underlying variables.

The parsimonious three information-theoretic variables selected herein ($D_R$, I, and $E_f$) showed significant improvement in performance in a majority voting scheme as compared to other standard measures used in the identification of objects in images. Both computational time and computational effort were saved when using the parsimonious set of information-theoretic variables as compared to a more complex simulation including additional variables. The three majority voter decision-making scheme for object recognition has the advantages of reduced computational time, reduced complexity and simplicity.

Figure 10:
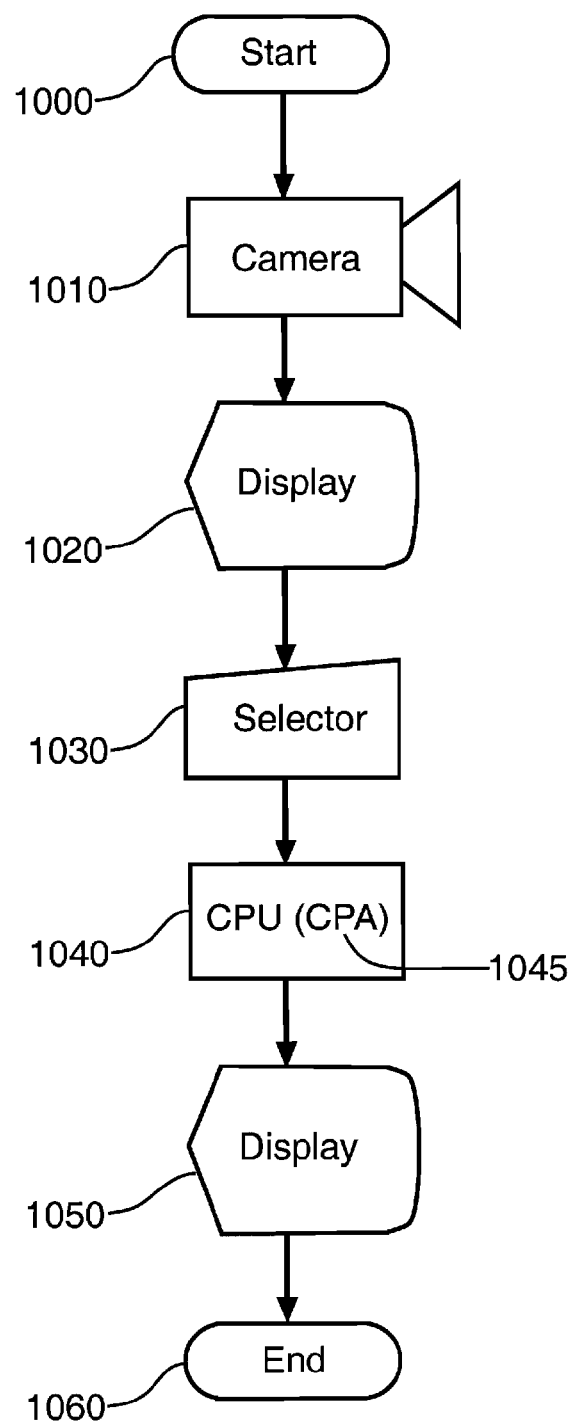
FIG. 10 is a partially schematic flow chart of a viewer and central processing unit for implementing one example embodiment of the invention.

FIG. 10 is a partially schematic flow chart of an optical viewer 1010 and a central processing unit 1040 for analyzing an image according to the teachings of the present invention.

The parsimonious three information-theoretic variables are used to define a central processing algorithm (CPA) 1045 which runs on central processing unit 1040, which may be any processing unit known in the art. Central processing algorithm 1045 may be compiled using any software known in the art.

Once identified, an identified object may be displayed on an optical device or viewer 1020, shown here including a camera 1010. Display 1020 may be a text message and enhanced image or a file image of the object. Examples of optical devices or viewers include binoculars, monoculars, telescopes, liquid crystal displays, televisions, or the heads of display of a vehicle such as an aircraft. The present method may be incorporated into any number of optical apparatuses, here, in combination, a camera 1010, a display 1020, an objects selector 1030, CPU 1040, and a display 1050, for identifying an object in an image viewed by the optical apparatus. The optical apparatus may include an optical viewer such as those disclosed above, an objects selector 1030 for selecting an object to be identified, a central processing unit 1040 for assessing the identity of the object to be identified, the assessing based upon only three independent inputs, the inputs including $D_R$, I(x; y) and $E_F$.

The objects selector 1030 may be any such selector known in the art. It may automatically be calculated based upon what object is in the center of an optical viewer, it may be selectable by a mouse, a button on the apparatus, or magnification to focus the viewer on the object. A picture or text representation of the object to be identified may be displayed upon the optical viewer. The viewer may also display a degree of certainty of the identification of the object based upon the results of the above calculations.

While specific embodiments have been described in detail in the foregoing description and illustrated in the drawings, those with ordinary skill in the art may appreciate that various modifications to the details provided could be developed in light of the overall teachings of the disclosure. The particular arrangements disclosed are intended to be illustrative and not limiting as to the scope of the invention, which is to be given the full breadth of the claims herein.

What is claimed is:

1. A method for distinguishing an object in an image comprising the steps of
    detecting an image with an optical device, the image including at least one object;
    identifying at least one object using a central processing unit (CPU),
        the CPU including a central processing algorithm (CPA),
            the CPA includes a majority voting analysis of multiple inputs analyzing at least one object using the CPA;
    displaying a CPU selected image on the optical device; and,
    wherein the CPA includes only three parsimonious information-theoretic measures.

2. The method of claim 1 wherein the three parsimonious information-theoretic measures are $D_R$, $I(x; y)$ and $E_F$.

3. A method for distinguishing an object in an image comprising the steps of
    detecting an image with an optical device, the image including at least one object;
    identifying at least one object using a central processing unit (CPU),
        the CPU including a central processing algorithm (CPA),
            the CPA includes a majority voting analysis of multiple inputs analyzing at least one object using the CPA;
    displaying a CPU selected image on the optical device; and,
    wherein the multiple inputs are three independent inputs, the independent inputs are $D_R$, $E_F$, and $I(x; y)$.

4. A method for distinguishing an object in an image comprising the steps of
    detecting an image with an optical device, the image including at least one object;
    identifying at least one object using a central processing unit (CPU),
         the CPU including a central processing algorithm (CPA),
            the CPA includes a majority voting analysis of only three parsimonious information-theoretic measures to identify at least one object, the three parsimonious information-theoretic measures being $D_R$, $I(x; y)$ and $E_F$ multiple inputs;
    using the voting analysis of the three parsimonious information-theoretic measures to identify at least one object;
    analyzing at least one object using the CPA,
    displaying an identified object image on the optical device.

5. The method of claim 4 wherein the identified object image is a file image of the identified object.

6. The method of claim 4 wherein the identified object image is a text description of the identified object.

7. The method of claim 4 wherein the identified object image includes an identification certainty percentage.

8. The method of claim 4 wherein the optical device is any one of a binocular, a monocular, a night vision goggle, a helmet mounted display, or a combination thereof.

9. An optical apparatus for identifying an object in an image viewed by the optical apparatus, the optical apparatus including:
    an optical viewer;
    an objects selector for selecting an object to be identified;
    a central processing unit for assessing the identity of the object to be identified, the assessing based upon only three independent inputs, the inputs including $D_R$, $I(x; y)$ and $E_F$.

10. The apparatus of claim 9 wherein the optical viewer is any one of a binocular, a monocular, a night vision goggle, a helmet mounted display, an aircraft heads up display, or a combination thereof.

11. The apparatus of claim 9 wherein the objects selector is a button to begin analysis on the object and a center of the optical viewer.

12. The apparatus of claim 9 wherein a representation of the object to be identified is displayed upon the optical viewer.

13. The apparatus of claim 9 wherein the identity of the object includes a degree of certainty of the identification of the object.

* * * * *